United States Patent
Takahashi et al.

(10) Patent No.: US 7,170,286 B2
(45) Date of Patent: Jan. 30, 2007

(54) MAGNETIC MATERIAL DETECTING DEVICE

(75) Inventors: Kunihiro Takahashi, Kanagawa (JP); Mario Fuse, Kanagawa (JP); Shoji Yamaguchi, Kanagawa (JP); Tetsuya Kimura, Kanagawa (JP); Saburo Ito, Tokorozawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/226,286

(22) Filed: Sep. 15, 2005

(65) Prior Publication Data

US 2006/0076945 A1   Apr. 13, 2006

(30) Foreign Application Priority Data

Sep. 16, 2004   (JP)   ............... 2004-269777

(51) Int. Cl.
  *G01R 33/12*   (2006.01)
  *G01N 27/72*   (2006.01)
(52) U.S. Cl. ...................... 324/228; 324/239
(58) Field of Classification Search ........ 324/261, 324/228, 239
  See application file for complete search history.

(56) References Cited

U.S. PATENT DOCUMENTS

| | | | |
|---|---|---|---|
| 4,956,666 A * | 9/1990 | Allen et al. .......... | 399/366 |
| 5,194,805 A * | 3/1993 | Nakajima et al. ...... | 324/207.16 |
| 6,541,965 B1 * | 4/2003 | Binder et al. ........ | 324/243 |
| 6,902,110 B1 * | 6/2005 | Belka et al. ......... | 235/449 |
| 7,012,424 B1 * | 3/2006 | Obama et al. ......... | 324/232 |
| 2003/0010903 A1 * | 1/2003 | Hsu .................. | 250/222.1 |
| 2005/0225322 A1 * | 10/2005 | Muller et al. ........ | 324/239 |

FOREIGN PATENT DOCUMENTS

| | | |
|---|---|---|
| JP | A 7-76195 | 3/1995 |
| JP | A 2000-266860 | 9/2000 |
| JP | A 2001-160117 | 6/2001 |

* cited by examiner

*Primary Examiner*—Andrew H. Hirshfeld
*Assistant Examiner*—Amy He
(74) *Attorney, Agent, or Firm*—Oliff & Berridge, PLC (57) ABSTRACT

A magnetic material detecting device which detects a magnetic material by applying a magnetic field to the magnetic material and detecting a magnetic field generated from the magnetic material by the applied magnetic field, and which includes a magnetizing coil which emits a magnetic field that excites the magnetic material, and a dummy coil which generates a magnetic field that excites the magnetic material by electromagnetic induction caused by the magnetic field emitted from the magnetizing coil, in which the dummy coil is disposed at a position where the electromagnetic induction is generated.

18 Claims, 6 Drawing Sheets

MAGNETIC MATERIAL DETECTING DEVICE

BACKGROUND OF THE INVENTION

1. Field of the Invention

The present invention relates to a magnetic material detecting device, and more particularly to a magnetic material detecting device of which magnetic material detection accuracy is improved by disposing a magnetic material detecting coil to enable to detect the magnetic material in a large area.

2. Description of the Related Art

In recent years, there are provided various methods and devices to enhance security such as prevention of leakage of confidential information, personal information and the like, prevention of counterfeiting of valuable securities and the like, and theft-prevention of commodities and the like. For example, there is known a copy-protected printed material for prevention of counterfeiting.

The above copy-protected printed material is configured to prevent it from being copied illegally for counterfeiting by forming latent images having different reflectivity and hue on printing paper to make it hard to copy by the difference in reflectivity and hue of the latent images formed on the printing paper or to copy in such a way enabling to discriminate as a reproduction when the printed material which is printed on the printing paper is copied by a monochrome copy machine or a color copy machine.

But, such a method needs to scan the print sheet or to emit light from a prescribed direction in order to detect the latent images having different reflectivity and hue formed on the print sheet, and it is desired to propose methods and devices for disabling unauthorized copying without performing the above operation.

There is also known a device security management system that is configured to make a user carry an RFID (Radio Frequency Identification) and also to attach an RFID to confidential documents and to prohibit copying according to information read from the RFIDs so that unauthorized copying of a printed material having confidential information or the like printed on it can be prohibited.

The above-described device security management system requires the user to always carry the RFID. Therefore, it is desired that a method and a device capable of surely preventing a printed material from being copied without authorization without placing a heavy burden on the user.

Lately, in libraries, supermarkets, various types of rental shops and the like, an antitheft system, that a medium to be detected which can be detected without contacting is applied to mediums such as books, commodities and the like and a detecting device for detecting the medium to be detected is disposed near the exit in order to prevent the books, commodities and the like from being stolen, is becoming widely popular.

The above antitheft system is configured such that if a medium is attempted to be wrongfully taken out, the detecting device disposed in the vicinity of the exit detects the medium to be detected, which is attached to the medium, without contacting and activates an alarm or the like to prevent the medium from being stolen.

For example, there is known a magnetic tape detecting device that can detect not only the presence or not of a magnetic tape which is used to prevent books and commodities from being taken wrongfully but also the number of magnetic tapes. Further improvement of the magnetic tape detection accuracy enables to apply the magnetic tape detecting device to various kinds of uses for prevention of a fraudulent procedure, settlement of amount and the like involved in, for example, self-service in a library to borrow a book and an unmanned shop.

In order to further improve the magnetic tape detection accuracy, the above-described magnetic tape detecting device has plural detecting coils linearly connected in the same winding direction and plural bias coils for applying a bias magnetic field to the magnetic tapes connected with mutually adjacent bias coils linearly connected in the opposite winding direction from each other, thereby controlling a direction in that the magnetic tapes are magnetized by external magnetic fields which are emitted from the plural bias coils and detecting the number of magnetic tapes according to the detected result of the pulse magnetic fields emitted by the magnetic tapes.

But, the above-described magnetic tape detecting method needs to limit the positional relationships of the magnetic tapes, the detecting coils and the bias coils to some extent in order to further improve the magnetic tape detection accuracy.

For example, where the above-described magnetic tape detecting device is applied as an antitheft device to detect the magnetic tape given to a medium by the magnetic tape detecting device disposed in the vicinity of the exit, it is general that a magnetic field distribution has a characteristic that it attenuates sharply than an electric field distribution when it comes far from the center of the magnetic field. Therefore, it is hard to control the magnetizing direction of the magnetic tape by the external magnetic fields emitted from the plural bias coils.

SUMMARY OF THE INVENTION

An aspect of the present invention provides a magnetic material detecting device which detects a magnetic material by applying a magnetic field to the magnetic material and detecting a magnetic field generated from the magnetic material by the applied magnetic field, and which includes a magnetizing coil which emits a magnetic field that excites the magnetic material, and a dummy coil which generates a magnetic field that excites the magnetic material by electromagnetic induction caused by the magnetic field emitted from the magnetizing coil, in which the dummy coil is disposed at a position where the electromagnetic induction is generated.

BRIEF DESCRIPTION OF THE DRAWINGS

Embodiments of the present invention will be described in detail based on the following figures, wherein.

DETAILED DESCRIPTION OF THE INVENTION

A magnetic material detecting device according to an aspect of the present invention is mounted on an image forming device such as a copy machine, and a magnetic material is applied to printed materials which have, for example, confidential information or the like printed in order to prevent leaks of information, to maintain confidentiality or to manage documents. If such a printed material is attempted to be copied without authorization, the magnetic material detecting device according to the present invention detects the magnetic material applied to the printed material and controls to prevent the copy machine from performing a copying processing operation, thereby capable of preventing confidential information from being copied without authorization and preventing the confidential information from being leaked.

The magnetic material applied to the printed materials has a large Barkhausen effect, or a characteristic of conducting magnetostrictive vibration, and it is also possible to identify a printed material by applying the printed materials with plural magnetic materials having various shapes and sizes in combination.

The magnetic material having the large, Barkhausen effect or the magnetostrictive vibration characteristic causes magnetization reversal or magnetostrictive vibration when it receives a prescribed alternating magnetic field, so that the presence of the magnetic material can be detected in a noncontact manner by detecting a signal of the magnetic pulse or electromagnetic wave emitted at that time.

Accordingly, the magnetic material detecting device of an aspect of the present invention is configured to detect information of the magnetic material by giving a prescribed alternating magnetic field to the magnetic material applied to the printed material and detecting a signal of the magnetic pulse or the electromagnetic wave emitted from the magnetic material.

But, there is a possibility that the magnetic material applied to the printed material is falsely detected without being detected properly depending on the magnetic field strength of the alternating magnetic field given to the magnetic material or the detection output of the magnetic pulse or the electromagnetic wave emitted from the magnetic material, and it is desired that the magnetic material is detected over a large area without fail.

In the following example, a copy machine that can prevent unauthorized copying by preventing false detection of the magnetic material applied to the printed material and detecting information of the magnetic material without fail will be described.

EXAMPLE 1

An example of application of a magnetic material detecting device according to the present invention to a copy machine will be described in detail with reference to the accompanying drawings.

Figure 1A:
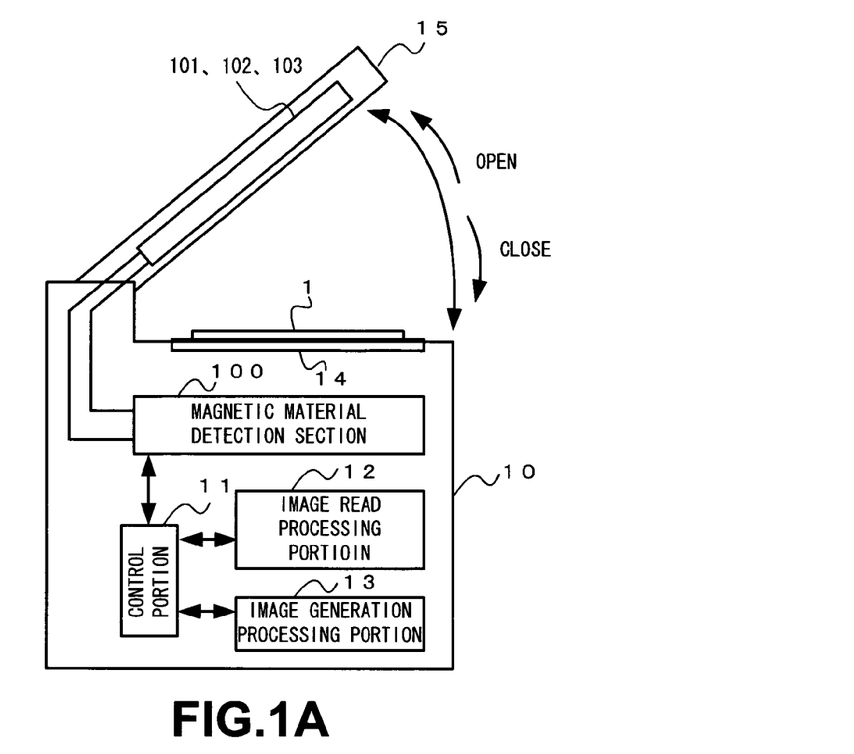
FIGS. 1A and 1B are schematic views of a copy machine (magnetic material detecting device) 10 to which a magnetic material detecting section 100 according to the present invention is applied.
Figure 1B:
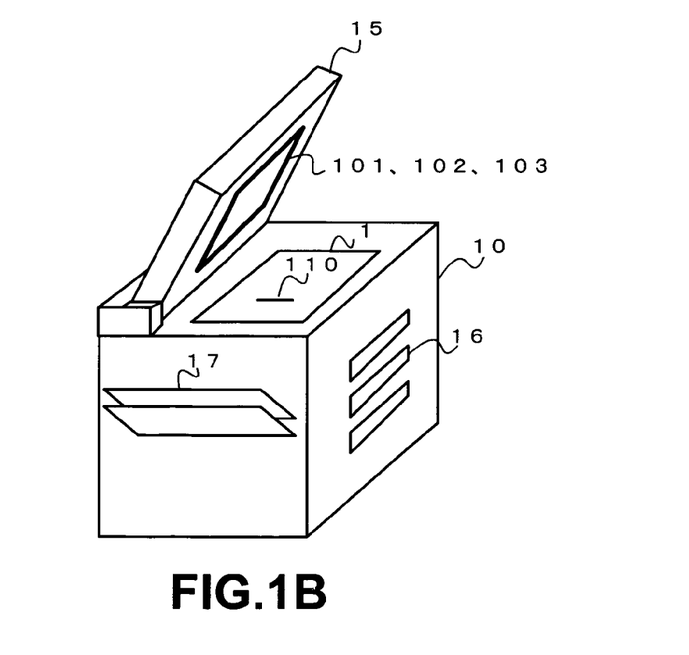

FIGS. 1A and 1B are schematic views of the copy machine 10 to which the magnetic material detecting section 100 is applied as the magnetic material detecting device according to the present invention.

FIG. 1A is a block view showing a schematic structure of the copy machine 10 to which the magnetic material detecting section 100 according to the present invention is applied, and FIG. 1B is a schematic, perspective view of the copy machine 10 shown in FIG. 1A.

As shown in FIGS. 1A and 1B, the copy machine 10 comprises the magnetic material detecting section 100 which detects whether or not the magnetic material 110 indicating non-copiable is applied to the original document 1 to be copied and placed on a platen glass 14 of the copy machine 10 and outputs a signal about a detected result; a control portion 11 which integrally controls the copy machine 10 as a whole, and if the magnetic material 110 applied to the original document 1 is detected by the magnetic material detecting section 100, controls to inhibit a copy operation of the copy machine 10 and to output an alarm or a message indicating non-copiable and the like as an audio warning, a warning lamp or the like; an image read processing portion 12 which emits light to the original document 1 placed on the platen glass 14, receives the reflection of the emitted light from the original document 1 by an unshown photoelectric converting element (e.g., CCD=Charge Coupled Device or the like), converts it into an electrical signal and reads image information recorded on the original document 1 according to the electrical signal converted by the photoelectric converting element; and an image generation processing portion 13 which prints the image information read by the image read processing portion 12 on an unshown copy paper fed from a sheet tray 16 and discharges the sheet to an output tray 17.

On the back surface of a platen cover 15 of the copy machine 10 are disposed the magnetizing coil 101 which emits a prescribed alternating magnetic field for magnetizing the magnetic material 110 which is applied to the original document 1; the detecting coil 102 which receives a precipitous magnetic pulse which is emitted by the magnetic material 110 when the magnetic material 110 is magnetized and performs magnetization reversal or an electromagnetic wave which is emitted by the magnetic material 110 when it is magnetized to vibrate magnetostrictively; and the dummy coil 103 which emits a magnetic field according to electromagnetic induction made by the alternating magnetic field emitted by the magnetizing coil 101.

Details of the magnetizing coil 101, the detecting coil 102 and the dummy coil 103 will be described later.

Copy processing or copy inhibition processing which is conducted by the copy machine 10 configured as described above according to the detected result of the magnetic material of the original document 1 placed on the platen glass 14 is described briefly.

When the original document 1 is placed on the platen glass 14 of the copy machine 10 and the platen cover 15 is closed (in the arrow direction in the drawing), the control portion 11 of the copy machine 10 activates the magnetic material detecting section 100 to operate prior to a copying operation that the image information of the original document 1 is read and printed out.

When the magnetic material detecting section 100 is activated, a prescribed alternating magnetic field is emitted from the magnetizing coil 101 of the magnetic material detecting section 100, the dummy coil 103 causes electromagnetic induction according to the alternating magnetic field, and an alternating magnetic field is also emitted secondarily from the dummy coil 103.

The alternating magnetic fields emitted from the magnetizing coil 101 and the dummy coil 103 provide a magnetic field distribution with a uniform strength in a large plane on the platen glass 14, and the magnetic material 110 applied to the original document 1 which is placed on the platen glass 14 is magnetized by receiving the alternating magnetic fields and emits a precipitous magnetic pulse at the time of magnetization reversal or an electromagnetic wave due to magnetostrictive vibration.

The magnetic pulse or the electromagnetic wave emitted from the magnetic material 110 is detected by the magnetic material detecting section 100 via the detecting coil 102, and the magnetic material 110 of the original document 1 is detected.

When the magnetic material 110 is detected according to the detected result of the magnetic material 110 of the original document 1 by the magnetic material detecting section 100, the control portion 11 of the copy machine 10 controls to output a message such as "This original document is non-copiable." or the like indicating copy inhibition or a warning beep or the like and to prohibit a copying processing operation.

Where the magnetic material 110 is not detected by the magnetic material detecting section 100, image information of the original document 1 placed on the platen glass 14 is read, the read image information is printed on a copy paper fed from the sheet tray 16, and the copy paper is discharged to the output tray 17.

Thus, the copy machine 10 identifies whether the original document is copiable or non-copiable before the copy processing operation of the original document placed on the platen glass 14 is performed. If it is identified as a non-copiable original document, the copy machine 10 controls to inhibit the copy processing operation, thereby enabling to prevent the non-copiable original document from being copied unexpectedly or without authorization and suppressing an unnecessary copying processing to save electric power of the copy machine 10.

The identification effected by the magnetic material detecting section 100 whether the original document placed on the platen glass 14 is copiable or non-copiable is not particularly limited when it is conducted and may be performed after the original document is placed on the platen glass 14, after a copy start instruction is given to the copy machine 10 or before the copy start instruction is given.

Figure 2:
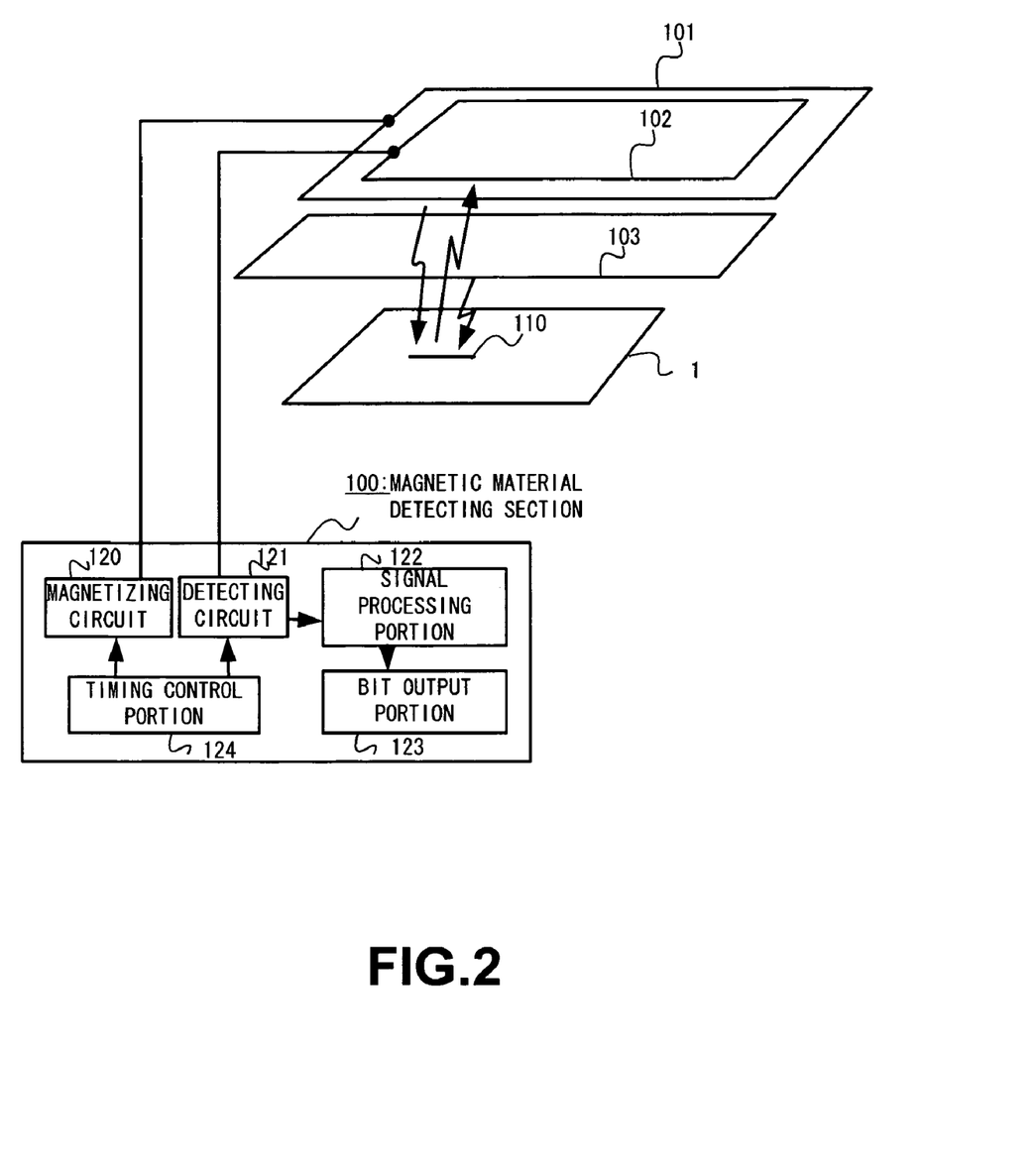
FIG. 2 is a block view showing a structure of a main portion of the magnetic material detecting section 100.

The copy machine 10 shown in FIGS. 1A and 1B is provided with the magnetic material detecting section 100 which detects the magnetic material applied to the original document without contacting even if the original document is placed in an arbitrary position and in an arbitrary direction on the platen glass 14. FIG. 2 is a block view showing the structure of a main portion of the magnetic material detecting section 100.

In FIG. 2, the construction of the magnetizing coil 101, the detecting coil 102 and the dummy coil 103 of the magnetic material detecting section 100 is schematically shown, and its details will be described later.

FIG. 2 shows an example of the magnetic material detecting device which is configured to recognize the presence of the magnetic material 110 applied to the original document 1 by the magnetic material detecting section 100 which gives a prescribed alternating magnetic field to the magnetic material 110 applied to the original document 1 and detects a precipitous magnetic pulse which is emitted when the magnetic material 110 is magnetized and its magnetization is reversed.

Specifically, the magnetic material detecting section 100 is provided with a magnetizing circuit 120 which controls to generate a prescribed alternating magnetic field via the magnetizing coil 101; a detecting circuit 121 which detects as a voltage signal via the detecting coil 102 a precipitous magnetic pulse which is emitted when the magnetic material 110 applied to the original document 1 receives prescribed alternating magnetic fields emitted from the magnetizing coil 101 and the dummy coil 103 and is magnetized and performs magnetization reversal; a signal processing portion 122 which processes the detected signal which is detected by the detecting circuit 121 and corresponds to an alternating magnetic field stored in an unshown memory or a magnetic pulse emitted by the magnetic material 110; a bit output portion 123 which performs bit output of information of the magnetic material applied to the original document 1 according to the information undergone the signal processing by the signal processing portion 122; and a timing control portion 124 which controls the timing of the magnetizing circuit 120 and the detecting circuit 121 such that the detecting circuit 121 can detect the alternating magnetic field or the magnetic pulse in timing corresponding to the cycle of the alternating magnetic field.

The magnetic material detecting section 100 configured as described above controls such that, for example, the magnetizing circuit 120 flows an electric current having a frequency of 1 kHz to the magnetizing coil 101, an alternating magnetic field having a frequency of 1 kHz is emitted from the magnetizing coil 101, an induced electromotive force is produced in the dummy coil 103, which is disposed next to the magnetizing coil 101, by the alternating magnetic field emitted from the magnetizing coil 101, and an alternating magnetic field is also generated secondarily from the dummy coil 10 by the induced electromotive force.

The timing control portion 124 detects a period in which a current value becomes zero in a rising direction of the current having a frequency of 1 kHz generated by the magnetizing circuit 120, namely a period in which the direction of the electric current is reversed from negative to positive, and outputs a reference signal to the detecting circuit 121 one time per cycle of the alternating magnetic field within the detected period.

The detecting circuit 121 takes in a detected signal detected by the detecting coil 102 based on the timing of the reference signal output from the timing control portion 124 and stores it in a memory of an unshown storage device.

The signal processing portion 122 removes, for example, an alternating magnetic field component from the detected signal stored in the memory, amplifies the positive signal component in the signal from which the alternating magnetic field component is removed, removes a noise component and detects a pulse signal corresponding to a magnetic pulse when the magnetization of each magnetic element is reversed.

The detected pulse signal detected by the signal processing portion 122 is output to the bit output portion 123, the bit output portion 123 converts it into bit information which is indicated as value "1" or "0" according to the detected pulse signal and outputs to the control portion 11 of the copy machine 10.

When the magnetic material 110 applied to the original document 1 is detected, the bit output portion 123 outputs, for example, a value "1", and when it is not detected, outputs, for example, a value "0".

Thus, the magnetic material detecting section 100 is configured such that it can detect securely the magnetic material applied to the original document without contacting even if the original document is placed in an arbitrary position in an arbitrary direction on the platen glass 14 and further improves detection accuracy by generating an alternating magnetic field of the magnetic field distribution with uniform strength in a large plane on the platen glass 14 and detecting a magnetic pulse emitted by the magnetic material 110 applied to the original document 1 in a large area on the platen glass 14.

FIGS. 3A through 3D are diagrams showing in detail an operation that the magnetic material detecting section 100 detects the magnetic material 110 applied to the original document 1.

Figure 3A:
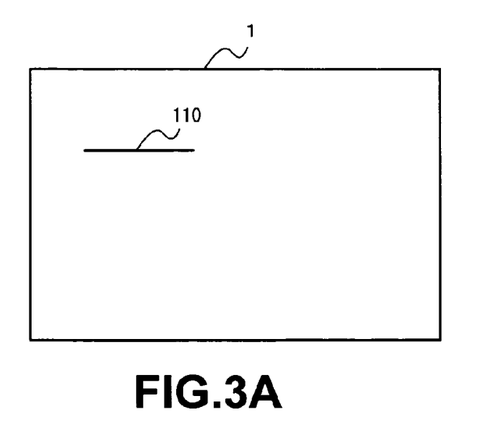
FIGS. 3A through 3D are diagrams showing in detail an operation that a magnetic material 110 applied to an original document 1 is detected by the magnetic material detecting section 100.
Figure 3B:
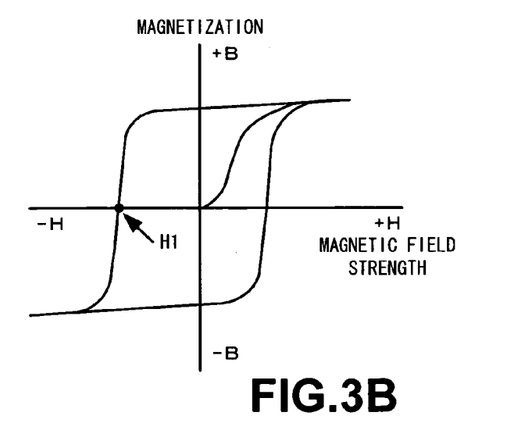
Figure 3C:
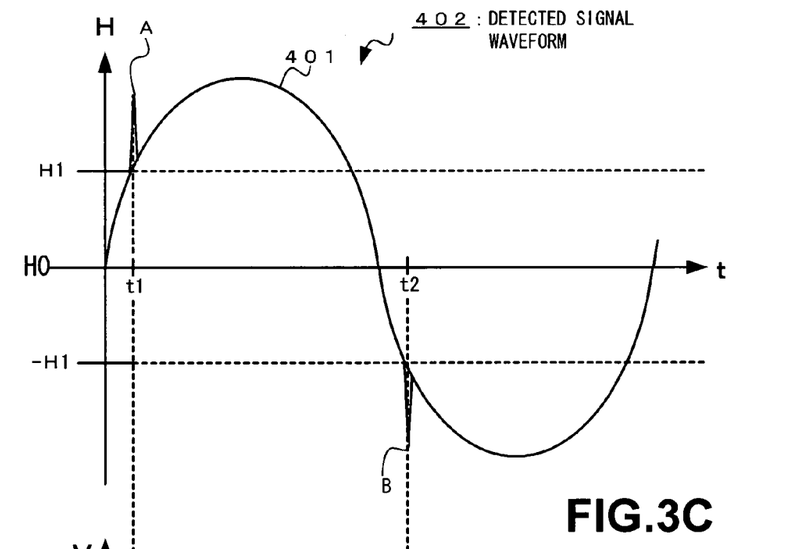
Figure 3D:
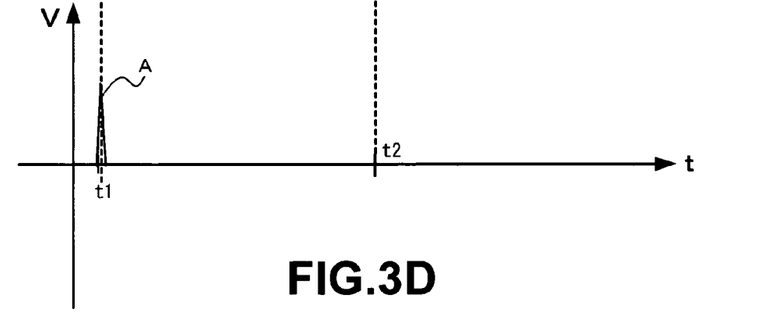

Among FIGS. 3A through 3D, FIG. 3A is a diagram showing the original document 1 applied to the magnetic material 110 indicating non-copiable, FIG. 3B is a diagram showing a magnetic characteristic of the magnetic material 110, FIG. 3C is a diagram showing a detected signal waveform detected by the detecting circuit 121, and FIG. 3D is a diagram showing the waveform of a detected pulse signal which is output from the signal processing portion 122 according to the detected waveform signal detected by the detecting circuit 121.

As shown in FIG. 3A, the magnetic material 110 indicating non-copiable is applied to the original document 1, a prescribed alternating magnetic field is given to the original document 1 to magnetize the magnetic material 110, and a magnetic pulse emitted when magnetization is reversed is detected via the detecting coil 102.

The magnetic material 110 is an amorphous magnetic wire having a magnetic characteristic indicated by a rectangular magnetization curve (B-H curve) as shown in FIG. 3B. And, when the magnetic material 110 having such a magnetization curve receives an alternating magnetic field, it exhibits a characteristic, the so-called large Barkhausen effect, that a precipitous magnetic pulse is emitted at the time of the magnetization reversal by receiving an alternating magnetic field having a magnetic field strength exceeding the intrinsic coercive force H1 (see FIG. 3B) possessed by the magnetic material 110.

Generally, the intrinsic coercive force possessed by the magnetic material of the amorphous magnetic wire is variable depending on the size, shape and the like of the magnetic material, and the strength of the magnetic pulse emitted at the time of magnetization reversal is also variable depending on the intrinsic coercive force possessed by the magnetic material.

Using the characteristic of the magnetic material of the amorphous magnetic wire, it is also possible to detect as the inherent identification information of the original document 1 by applying, for example, plural types in shape, size and the like of plural magnetic materials having a different coercive force in combination to the original document 1.

Thus, the magnetic material 110 indicating non-copiable is applied to the original document 1, and when the original document 1 is placed on the platen glass 14 of the copy machine 10 and the platen cover 15 is closed, the magnetic material 110 applied to the original document 1 receives alternating magnetic fields emitted from the magnetizing coil 101 and the dummy coil 103, its magnetization is reversed, and it emits a magnetic pulse on the basis of the large Barkhausen effect.

The detecting circuit 121 receives the alternating magnetic fields emitted from the magnetizing coil 101 and the dummy coil 103 and the magnetic pulse emitted by the magnetic material 110 at the time of its magnetization reversal via the detecting coil 102 according to the reference signal with timing controlled by the timing control portion 124, detects a detected signal waveform 402 shown in FIG. 3C and stores it in a digitized form in a memory of an unshown storage device.

In the detected signal waveform 402, detected pulse signals A, B corresponding to the magnetic pulses emitted when the magnetic material 110 has performed the magnetization reversal are detected in addition to a waveform signal 401 of the alternating magnetic field, and the detected pulse signals A, B are detected in correspondence with the precipitous magnetic pulse emitted when the magnetic material 110 has performed the magnetization reversal.

For example, as shown in FIG. 3C, the magnetic material 110 having the coercive force H1 performs magnetization reversal when the alternating magnetic field 401 has a magnetic field strength of approximately H1 at time t1 from the reference signal output from the timing control portion 124, and emits a precipitous magnetic pulse signal A at that time.

When the magnetic field strength of the alternating magnetic field 401 becomes −H1 at time t2, the magnetic material 110 performs magnetization reversal from positive magnetization to negative magnetization, and emits a precipitous magnetic pulse signal B at that time.

The detected signal waveform 402 detected by the detecting circuit 121 is output to the signal processing portion 122, the signal waveform 401 of an alternating magnetic field component in the detected signal waveform 402 is removed, the pulse signal A which is a positive signal component between the pulse signals A, B is detected and then amplified to remove noise components, and the detected pulse signal A shown in FIG. 3D is detected.

The method of detecting the detected pulse signal by the above-described signal processing portion 122 according to the detected signal waveform 402 is one example and not an exclusive signal processing method. For example, the signal processing may be performed according to the pulse signal B, the signal processing may be performed with the pulse signal of either the pulse signal A or B reversed, or the signal processing may be performed according to both of the pulse signals A, B. Thus, various methods capable of detecting the detected pulse signal can be applied.

The bit output portion 123 outputs bit information of, for example, a value "1" which indicates the detection of the magnetic material 110 to the control portion 11 of the copy machine 10 according to the detected pulse signal A detected by the signal processing portion 122.

If the detected pulse signal indicating that the magnetic material was detected by the signal processing portion 122, the bit output portion 123 outputs bit information of, for example, the value "0" indicating that the magnetic material is not detected to the control portion 11 of the copy machine 10.

Figure 4A:
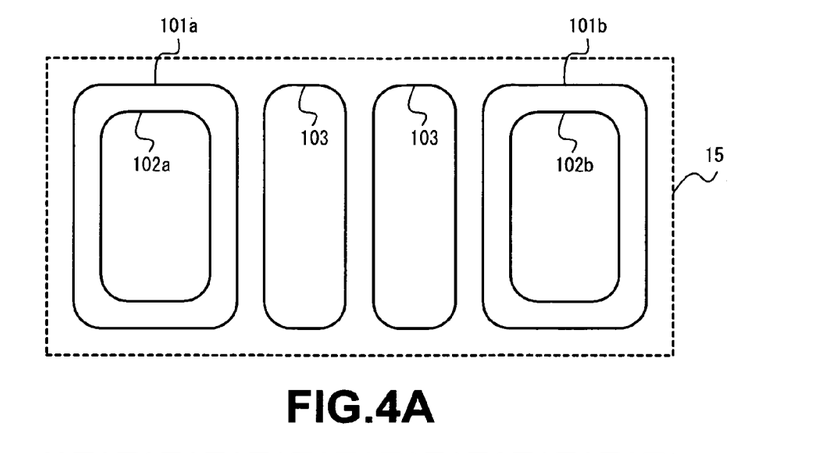
FIGS. 4A through 4C are views showing structures of a magnetizing coil 101, a detecting coil 102 and a dummy coil 103 of the magnetic material detecting section 100.
Figure 4B:
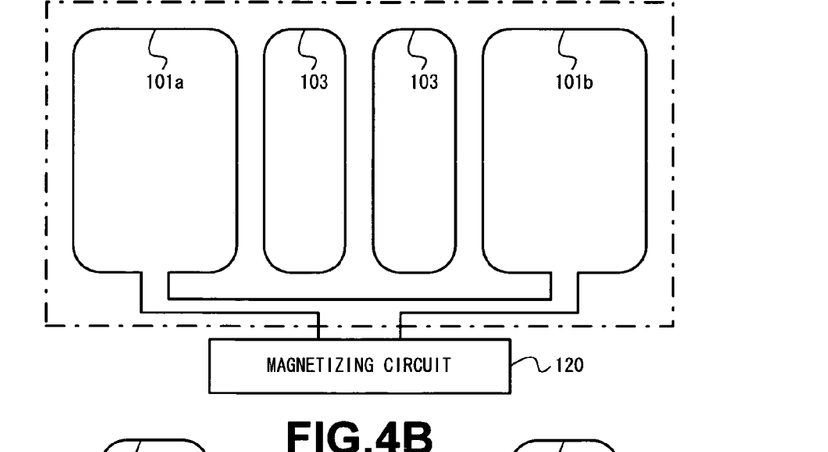
Figure 4C:
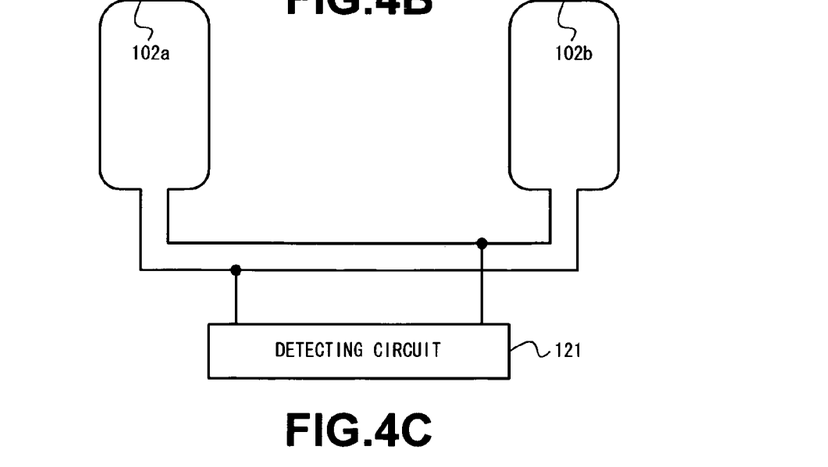

FIGS. 4A through 4C are diagrams showing the structures of the magnetizing coil 101, the detecting coil 102 and the dummy coil 103 of the magnetic material detecting section 100. FIG. 4A is a diagram showing a disposed state of the magnetizing coil 101, the detecting coil 102 and the dummy coil 103 which are disposed on the back surface of the platen cover 15 of the copy machine 10, FIG. 4B is a diagram showing a detail structure of the magnetizing coil 101 and the dummy coil 103, and FIG. 4C is a diagram showing a detail structure of the detecting coil 102 wherein individual coils are wound plural times.

The magnetizing coil 101 and the dummy coil 103 of the magnetic material detecting section 100 are disposed in the platen cover 15 of the copy machine 10 shown in FIG. 4A such that an alternating magnetic field in a magnetic field distribution with a uniform strength is generated in a large plane on the platen glass 14 of the copy machine 10, and a magnetic pulse emitted by the magnetic material 110 applied to the original document 1 placed on the platen glass 14 can be detected in a large area by the detecting coil 102.

As shown in FIG. 4B, the magnetizing coil 101 is configured as a single magnetizing coil by linearly connecting winding portions 101a, 101b, which have a track shape and are disposed at two positions, and connected to the magnetizing circuit 120.

The dummy coils 103 are formed by disposing an arbitrary number of coils, which are formed in a track shape, at equal intervals between the winding portions 101a and 101b of the magnetizing coil 101.

By configuring in this way, when an alternating magnetic field is given to the magnetic material 110 applied to the original document 1 in a plane on the platen glass 14, a magnetic field with a magnetic field distribution in a large area and having a uniform strength can be formed.

In this embodiment, an example that two dummy coils 103 are disposed is described.

The dummy coils 103 generate an induced electromotive force by an alternating magnetic field emitted from the magnetizing coil 101, and a secondary alternating magnetic field is generated from the dummy coil 103 by the induced electromotive force.

Where the dummy coils 103 are disposed in plural to be adjacent to each other continuously, the magnetic field distribution of the alternating magnetic field emitted from the magnetizing coil 101 provides an operation to expand the magnetic field strength to a far distance by a distance that the dummy coils 103 are disposed in comparison with a case that the dummy coils 103 are not disposed.

As shown in FIG. 4C, the detecting coil 102 is configured as a single detecting coil by linearly connecting the winding portions 102a, 102b which are formed in a track shape and disposed at two positions in the same way as the magnetizing coil 101 such that the individual winding portions 101a, 101b formed in a track shape of the magnetizing coil 101 are partly contacted within the track, and the main portion is formed to be at equal intervals within the minor axis of the track shape of the magnetizing coil 101.

Individual windings of the magnetizing coil 101, the detecting coil 102 and the dummy coil 103 are wound plural times in the same direction and configured such that the direction of driving current from the magnetizing coil 101 is also same.

Thus, the directions of an induced electromotive force and a sent current, and the directions of the received signal current and the electric current generated in the adjacent coil by the received signal current become opposite to each other, so that the individual currents do not cancel each other.

As described above, by disposing the dummy coils 103 in addition to the magnetizing coil 101 and the detecting coil 102, an alternating magnetic field in a magnetic field distribution with a uniform strength can be generated in a large plane, and the magnetic pulse emitted by the magnetic material 110 applied to the original document 1 can be detected over a large area.

It was described above that the magnetizing coil 101, the detecting coil 102 and the dummy coil 103 of the magnetic material detecting section 100 were disposed in the platen cover 15 in correspondence with the structure of the copy machine 10. But, their disposition is not limited to the described state but the individual coils 101, 102 and 103 may be disposed below the platen glass 14 or may be disposed in a form printed on the platen glass, or the individual coils 101, 102 and 103 may be disposed in combination on the back surface of the platen cover 15 and on the platen glass 14.

In correspondence with the constructions of the various devices to detect the magnetic material, the arrangement of the magnetizing coil 101, the detecting coil 102 and the dummy coil 103 may be changed in various ways. For example, the individual coils 101, 102 and 103 may be disposed in a desired area to detect the magnetic material if an induced electromotive force is generated in the dummy coil 103 by the alternating magnetic field emitted by the magnetizing coil 101 and the magnetic field can be generated from the dummy coil 103 by the induced electromotive force. And, the individual coils 101, 102 and 103 are not limited to the track shape but may be formed to have an arbitrary shape.

EXAMPLE 2

What was described in Example 1 was an example of the magnetic material detecting device capable of detecting over a large area the magnetic material having the magnetic characteristic that the magnetic material magnetized by receiving a prescribed alternating magnetic field emits the magnetic pulse at the time of magnetization reversal.

In Example 2, an example of the magnetic material detecting device capable of detecting over a large area the magnetic material having a magnetic characteristic that the magnetic material magnetized by receiving a prescribed alternating magnetic field vibrates magnetostrictively and emits an electromagnetic wave is described.

For convenience of explanation, it will be described assuming that the individual parts of a copy machine have the same structures as those of the copy machine 10 excepting the magnetic material detecting section 100 of the copy machine 10 shown in FIG. 1 of Example 1, and a magnetic material having a magnetic characteristic of vibrating magnetostrictively upon receiving a prescribed alternating magnetic field is detected to recognize that an original document to which the magnetic material is applied is non-copiable, and it is controlled to inhibit the copy processing operation.

Accordingly, the structures and operations of the individual portions other than the magnetic material detecting section that detects the magnetic material which vibrates magnetostrictively upon receiving a prescribed alternating magnetic field will not be described here. The structure of a main portion of the magnetic material detecting section and an operation of the magnetic material detecting section to detect the magnetic material applied to an original document and having a characteristic to vibrate magnetostrictively will be described in detail.

Figure 5:
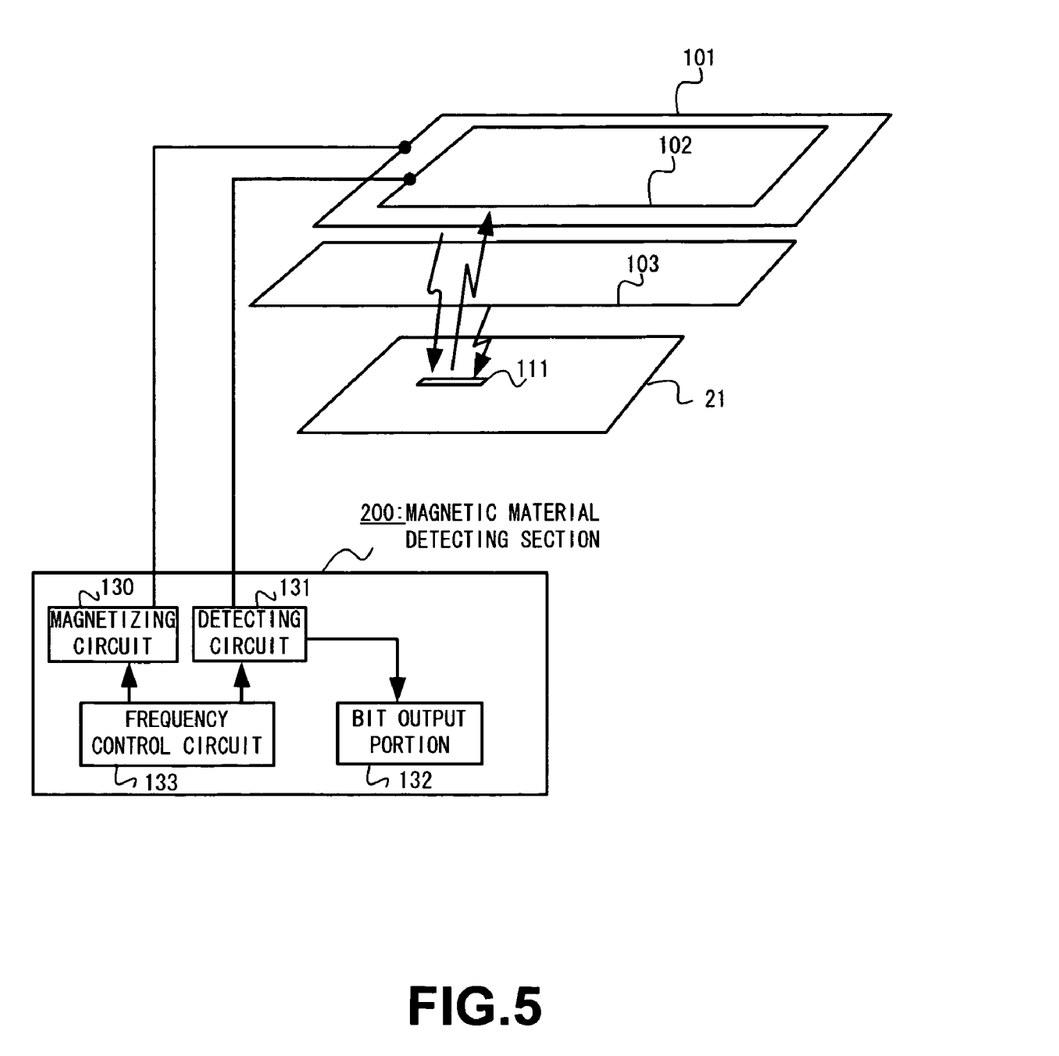
FIG. 5 is a block view showing a structure of a main portion of another magnetic material detecting section 200 different from the magnetic material detecting section 100.

FIG. 5 is a block diagram showing a structure of the main portion of a magnetic material detecting section 200 capable of detecting over a large area the magnetic material having a magnetic characteristic of performing magnetostrictive vibration upon receiving a prescribed alternating magnetic field.

As shown in FIG. 5, the magnetic material detecting section 200 is configured such that a prescribed alternating magnetic field is given to a magnetic material 111 which is applied to an original document 21 to cause the magnetic material 111 to vibrate magnetostrictively, the electromagnetic wave emitted by the magnetic material 111 at that time is detected, and the presence of the magnetic material 111 applied to the original document 21 is recognized.

It is configured to repeat an operation that the alternating magnetic field emitted from the magnetizing coil 01 varies sequentially from a prescribed low frequency to a prescribed high frequency, and after reaching the prescribed high frequency, varies again sequentially from the prescribed low frequency to the prescribed high frequency.

Specifically, the magnetic material detecting section 200 comprises a magnetizing circuit 130 which controls to emit a prescribed alternating magnetic field which varies sequentially from a low frequency to a high frequency via the magnetizing coil 101; a detecting circuit 131 which detects as a voltage signal via the detecting coil 102 the electromagnetic wave which is emitted when the magnetic material 111 applied to the original document 21 vibrates magnetostrictively upon receiving the prescribed alternating magnetic fields emitted from the magnetizing coil 101 and the dummy coil 103; a bit output portion 132 which outputs, in bits, information of the magnetic material 111 applied to the original document 21 according to the detected signal detected by the detecting circuit 131; and a frequency control circuit 133 which controls the frequencies of the magnetizing circuit 130 and the detecting circuit 131.

The frequency control circuit 133 performs a control operation of a band limit or the like of the determined frequency of an unshown band pass filter circuit or the like of the detecting circuit 131 in correspondence with the frequency of the alternating magnetic field generated by the magnetizing circuit 130.

The magnetic material detecting section 200 configured as described above controls so that a voltage is given to an unshown voltage control oscillation circuit (e.g., VCO=Voltage Controlled Oscillator) by, for example, the magnetizing circuit 130, a waveform signal corresponding to the voltage which is controlled by the voltage control oscillation circuit is generated, power amplification of the generated waveform signal is performed, and the alternating magnetic field, which linearly varies continuously from a low frequency to a high frequency or from a high frequency to a low frequency, is emitted via the magnetizing coil 101.

In this example, the alternating magnetic field which continuously varies linearly from a prescribed low frequency to a prescribed high frequency is emitted intermittently.

Specifically, the alternating magnetic field of a prescribed low frequency is emitted for a prescribed period, the emission is stopped for a prescribed period, then an alternating magnetic field of a prescribed high frequency is emitted for a prescribed period, the emission is stopped for a prescribed period, thus the same emission and stop of emission are repeated until the alternating magnetic field reaches a prescribed high frequency.

When the frequency of the alternating magnetic field reaches the prescribed high frequency, the operation that the emission and the stop of emission of the alternating magnetic field which continuously varies linearly from a prescribed low frequency to a prescribed high frequency is repeated again.

Thus, the alternating magnetic field which continuously varies linearly from the prescribed low frequency to the prescribed high frequency is intermittently emitted from the magnetizing coil 101, the dummy coil 103 which is disposed next to the magnetizing coil 101 generates an induced electromotive force in correspondence with the prescribed alternating magnetic field emitted from the magnetizing coil 101, and this induced electromotive force causes to emit an alternating magnetic field having a prescribed frequency secondarily from the dummy coil 103.

The detecting circuit 131 detects via the detecting coil 102 an electromagnetic wave which is emitted by the magnetic material 111 as the magnetic material 111 applied to the original document 21 receives the alternating magnetic field and vibrates magnetostrictively and outputs, in bits, information of the magnetic material 111 of the original document 21 as a value "1" or "0" according to the detected signal.

Specifically, the electromagnetic wave emitted by the magnetostrictive vibration of the magnetic material 111 detected via the detecting coil 102 is detected as a received signal of the voltage signal, filtered by an unshown band pass filter circuit or the like in the detecting circuit 131 and amplified by an unshown amplifier circuit or the like, and the presence of the magnetic material 111 applied to the original document 21 is output as a detected signal to the bit output portion 132.

The bit output portion 132 converts to information of bits expressed in the value "1" or "0" according to the input detected signal and outputs to the control portion of the copy machine.

When the magnetic material 111 applied to the original document 21 is detected, it is indicated by, for example, the value "1" and output from the bit output portion 132, but if not, it is indicated by, for example, the value "0" and output.

The operation to detect the magnetic material 111 applied to the original document 21 by the magnetic material detecting section 200 configured as described above will be described in detail with reference to FIGS. 6A, 6B.

Figure 6A:
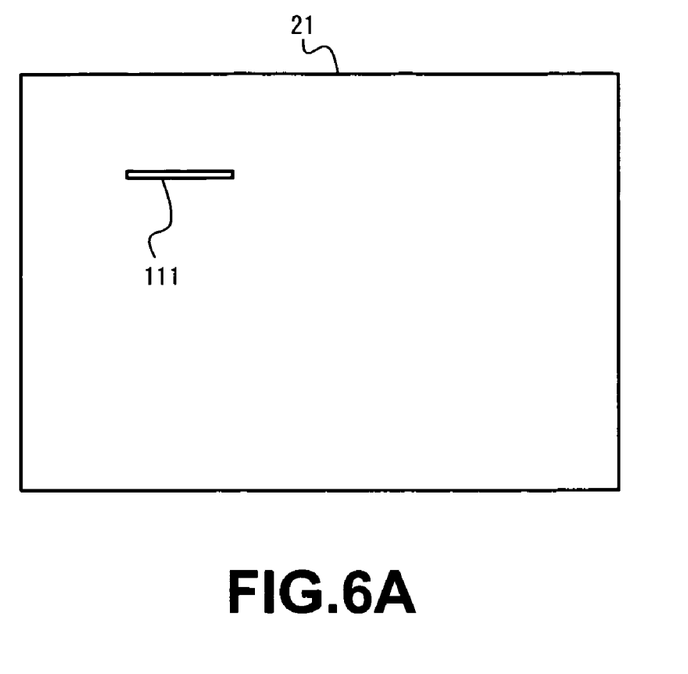
FIGS. 6A and 6B are diagrams showing in detail an operation that a magnetic material 111 applied to an original document 21 is detected by the magnetic material detecting section 200.
Figure 6B:
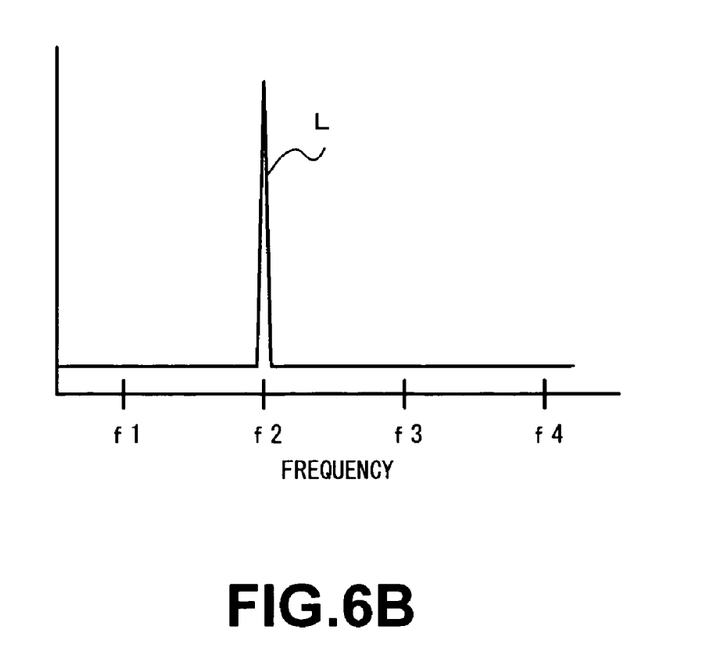

FIGS. 6A, 6B are diagrams showing an example of the method of detecting the magnetic material 111 by the magnetic material detecting section 200 from the original document 21 to which the magnetic material 111, which vibrates magnetostrictively upon receiving a prescribed alternating magnetic field, is applied.

FIG. 6A is a diagram showing the original document 21 to which the magnetic material 11 is applied, and FIG. 6B is a diagram showing a detected signal of the magnetic material 111 formed on the original document 21 detected by the detecting circuit 131.

As shown in FIG. 6A, the magnetic material 111 applied to the original document 21 is a magnetic material such as ferrite, amorphous or the like and has a so-called magnetostrictive characteristic that causes a change in dimension upon receiving the magnetic field from outside.

Where a prescribed alternating magnetic field which varies sequentially from a low frequency to a high frequency or from a high frequency to a low frequency is given to the magnetic material 111 having the magnetostrictive characteristic, the magnetic material 111 magnetostrictively vibrates most largely when it receives an alternating magnetic field having a particular frequency.

The frequency of the alternating magnetic field by which the magnetic material 111 magnetostrictively vibrates most largely is variable depending on a coercive force corresponding to the size, shape and the like of the magnetic material 111, and the alternating magnetic field has an intrinsic frequency (hereinafter referred to as the "resonance frequency") depending on the size, shape and the like of the magnetic material 111.

Conversely, when the magnetic material 111 vibrates magnetostrictively, the magnetic material 111 causes a change in dimension and emits an electromagnetic wave.

Accordingly, the presence of the magnetic material 111 applied to the original document 21 can be detected by giving an alternating magnetic field corresponding to the resonance frequency inherent to the magnetic material 111 to the magnetic material 111 applied to the original document 21 to cause it to vibrate magnetostrictively and detecting the electromagnetic wave emitted by the magnetic material 111.

Specifically, the magnetic material 111 having a resonance frequency f2 which magnetostrictively vibrates most largely upon receiving the alternating magnetic field receives an alternating magnetic field, which varies sequentially from a prescribed low frequency to a prescribed high frequency, emitted via the magnetizing coil 101 and the dummy coil 103, and the magnetic material 111 vibrates magnetostrictively and emits an electromagnetic wave when the frequency of the alternating magnetic field is close to f2.

The electromagnetic wave emitted from the magnetic material 111 is received via the detecting coil 102 and detected as a detected signal L as shown in FIG. 6 by the detecting circuit 131.

According to the detected signal L detected by the detecting circuit 131, the bit output portion 132 outputs, for example, bit information of the value "1" indicating, that the magnetic material 111 has been detected, to the control portion of the copy machine.

The magnetic material detecting section 200 intermittently emits an alternating magnetic field which continuously varies linearly from a prescribed low frequency to a prescribed high frequency via the magnetizing coil 101, and receives via the detecting coil 102 an electromagnetic wave which is emitted by the magnetostrictive vibration of the magnetic material 111 within a prescribed period when the emission of the alternating magnetic field is stopped temporarily. Therefore, it may also be configured so that the magnetizing coil 101 also serves as the detecting coil 102.

For example, when plural types of plural magnetic materials having different shapes, sizes and the like are applied in combination to the original document based on the characteristic that a resonance frequency, which magnetostrictively vibrates most largely when the magnetic material receives the alternating magnetic field, is variable depending on the size, shape and the like of the magnetic material, they can be detected as identification information intrinsic to the original document.

The present invention can be applied to various types of devices for detecting the magnetic material and can be used with the magnetizing coil, the detecting coil and the dummy coil disposed at desired positions of the devices.

And, when the invention is applied to the image forming device such as a copy machine, a printing machine and the like, the individual coils can be disposed at desired positions such as individual trays such as a sheet tray, an output tray and the like, and a sorter and the like to detect the magnetic material having a desired magnetic characteristic.

And, the magnetic material formed on an original document or a printing sheet can be detected before and after or during the image reading processing, before and after the print out, and the like.

As described above, a first aspect of the present invention provides a magnetic material detecting device which detects a magnetic material by applying a magnetic field to the magnetic material and detecting a magnetic field generated from the magnetic material by the applied magnetic field, and which includes a magnetizing coil which emits a magnetic field that excites the magnetic material, and a dummy coil which generates a magnetic field that excites the magnetic material by electromagnetic induction caused by the magnetic field emitted from the magnetizing coil, in which the dummy coil is disposed at a position where the electromagnetic induction is generated.

A second aspect of the present invention is the magnetic material detecting device in the first aspect of the present invention, in which the magnetizing coil and the dummy coil may be wound in the same direction.

A third aspect of the present invention is the magnetic material detecting device in the first aspect of the present invention, in which plural magnetizing coils may be provided, and the dummy coil may be disposed between the plural magnetizing coils.

A fourth aspect of the present invention is the magnetic material detecting device in the first aspect of the present invention, in which the magnetizing coil or the dummy coil may be disposed on a cover which covers a medium having the magnetic material.

A fifth aspect of the present invention is the magnetic material detecting device in the fourth aspect of the present invention, in which a detection control part may be provided which detects the magnetic material in association with an opening and closing operation of the cover.

A sixth aspect of the present invention is the magnetic material detecting device in the first aspect of the present invention, in which the magnetizing coil or the dummy coil may be disposed below a support which supports a medium having the magnetic material.

A seventh aspect of the present invention is the magnetic material detecting device in the first aspect of the present invention, in which the magnetizing coil or the dummy coil may be disposed on a passage through which a medium having the magnetic material moves.

An eighth aspect of the present invention is the magnetic material detecting device in the first aspect of the present invention, which may further include an image information reading part which reads image information of a medium having the magnetic material, and a control part which controls an image information reading operation according to a result of the detection of the magnetic material.

A ninth aspect of the present invention is the magnetic material detecting device in the first aspect of the present invention, which may further include an image information reading part which reads and outputs image information of a medium having the magnetic material, and a control part which controls an image information output operation according to a result of the detection of the magnetic material.

A tenth aspect of the present invention is the magnetic material detecting device in the first aspect of the present invention, which may further include an image information reading unit which reads image information of a medium having the magnetic material, an image forming part which forms an image on a medium according to the read image information, and a control part which controls an image forming operation according to a result of the detection of the magnetic material.

An eleventh aspect of the present invention provides an image reading device which detects a magnetic material by applying a magnetic field to the magnetic material and detecting a magnetic field generated from the magnetic material by the applied magnetic field, which comprises a magnetizing coil which emits a magnetic field that excites the magnetic material, and a dummy coil which generates a magnetic field that excites the magnetic material by electromagnetic induction caused by the magnetic field emitted from the magnetizing coil, and a platen cover, in which the magnetizing coil or the dummy coil is disposed on the platen cover, and the dummy coil is disposed at a position where the electromagnetic induction is generated.

A twelfth aspect of the present invention provides a platen cover of an image reading device which detects a magnetic material by applying a magnetic field to the magnetic material and detecting a magnetic field generated from the magnetic material by the applied magnetic field, which includes a magnetizing coil which emits a magnetic field that excites the magnetic material, and a dummy coil which generates a magnetic field that excites the magnetic material by electromagnetic induction caused by the magnetic field emitted from the magnetizing coil, in which the dummy coil is disposed at a position where the electromagnetic induction is generated.

A thirteenth aspect of the present invention provides an image reading device which detects a magnetic material by applying a magnetic field to the magnetic material and detecting a magnetic field generated from the magnetic material by the applied magnetic field, which includes a magnetizing coil which emits a magnetic field that excites the magnetic material, a dummy coil which generates a magnetic field that excites the magnetic material by electromagnetic induction caused by a magnetic field emitted from the magnetizing coil, and a platen glass, in which the magnetizing coil or the dummy coil is disposed below the platen glass, and the dummy coil is disposed at a position where the electromagnetic induction is generated.

The magnetic material detecting device of the present invention, which detects the magnetic material by applying a magnetic field from the magnetizing coil to the magnetic material and detecting by the detecting coil the magnetic field generated from the magnetic material by the magnetic field applied to the magnetic material, includes a magnetizing coil which emits a magnetic field that excites the magnetic material and a dummy coil which generates a magnetic field that excites the magnetic material according to electromagnetic induction caused by the magnetic field generated from the magnetizing coil, in which the dummy coil at a portion opposed to the magnetizing coil is configured so that an induced current by the magnetizing coil flows in a direction opposite to that of an electric current flowing through the magnetizing coil at a portion opposed to the dummy coil. Therefore, magnetic field distribution which has a uniform strength in a large plane can be formed, and the magnetic material applied to the medium can be detected more securely even if the medium to which the magnetic material is applied is in an arbitrary position of a large area.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-269777 filed on Sep. 16, 2004 including specification, claims, drawings and abstract is incorporated herein by reference in its entirety.

What is claimed is:

1. A magnetic material detecting device which detects a magnetic material by applying a magnetic field to the magnetic material and detecting a magnetic field generated from the magnetic material by the applied magnetic field, comprising:
   a magnetizing coil which emits a magnetic field that excites the magnetic material; and
   a dummy coil which generates a magnetic field that excites the magnetic material by electromagnetic induction caused by the magnetic field emitted from the magnetizing coil,
   wherein the dummy coil is disposed at a position where the electromagnetic induction is generated, and
   the dummy coil has no electrically conductive connection to a driving circuit.

2. The magnetic material detecting device according to claim 1, wherein the magnetizing coil and the dummy coil are wound in the same direction.

3. The magnetic material detecting device according to claim 1, wherein plural magnetizing coils are provided, and the dummy coil is disposed between the plural magnetizing coils.

4. The magnetic material detecting device according to claim 1, wherein the magnetizing coil or the dummy coil is disposed on a cover which covers a medium having the magnetic material.

5. The magnetic material detecting device according to claim 4, wherein a detection control part is provided which detects the magnetic material in association with an opening and closing operation of the cover.

6. The magnetic material detecting device according to claim 1, wherein the magnetizing coil or the dummy coil is disposed below a support which supports a medium having the magnetic material.

7. The magnetic material detecting device according to claim 1, wherein the magnetizing coil or the dummy coil is disposed on a passage through which a medium having the magnetic material moves.

8. The magnetic material detecting device according to claim 1, further comprising:
   an image information reading part which reads image information of a medium having the magnetic material, and
   a control part which controls an image information reading operation according to a result of the detection of the magnetic material.

9. The magnetic material detecting device according to claim 1, further comprising:
   an image information reading part which reads and outputs image information of a medium having the magnetic material, and
   a control part which controls an image information output operation according to a result of the detection of the magnetic material.

10. The magnetic material detecting device according to claim 1, further comprising:
    an image information reading part which reads image information of a medium having the magnetic material,
    an image forming part which forms an image on a medium according to the read image information, and
    a control part which controls an image forming operation according to a result of the detection of the magnetic material.

11. The magnetic material detecting device according to claim 1, further comprising:
    an image information reading part which reads image information of a medium having the magnetic material, wherein:
    the image information reading part does not read the image information when the magnetic material is detected.

12. The magnetic material detecting device according to claim 1, further comprising:

an image information reading part which reads and outputs image information of a medium having the magnetic material, wherein:
the image information reading part does not output the read image information when the magnetic material is detected.

13. The magnetic material detecting device according to claim 1, further comprising:
an image information reading part which reads image information of a medium having the magnetic material, and
an image forming part which forms an image on a medium according to the read image information, wherein: the image forming part does not form an image when the magnetic material is detected.

14. The magnetic material detecting device according to claim 1, wherein the dummy coil is disposed at a position substantially opposed to the magnetizing coil.

15. The magnetic material detecting device according to claim 14, wherein an induced current which is generated by a magnetic field generated by the magnetizing coil flows in a direction opposite to that of an electric current flowing through the magnetizing coil at a portion opposed to the dummy coil.

16. An image reading device which detects a magnetic material by applying a magnetic field to the magnetic material and detecting a magnetic field generated from the magnetic material by the applied magnetic field, comprising:
a magnetizing coil which emits a magnetic field that excites the magnetic material;
a dummy coil which generates a magnetic field that excites the magnetic material by electromagnetic induction caused by the magnetic field emitted from the magnetizing coil; and
a platen cover,
wherein the magnetizing coil or the dummy coil is disposed on the platen cover,
the dummy coil is disposed at a position where the electromagnetic induction is generated, and
the dummy coil has no electrically conductive connection to a driving circuit.

17. A platen cover of an image reading device which detects a magnetic material by applying a magnetic field to the magnetic material and detecting a magnetic field generated from the magnetic material by the applied magnetic field, comprising:
a magnetizing coil which emits a magnetic field that excites the magnetic material; and
a dummy coil which generates a magnetic field that excites the magnetic material by electromagnetic induction caused by the magnetic field emitted from the magnetizing coil,
the dummy coil is disposed at a position where the electromagnetic induction is generated, and
the dummy coil has no electrically conductive connection to a driving circuit.

18. An image reading device which detects a magnetic material by applying a magnetic field to the magnetic material and detecting a magnetic field generated from the magnetic material by the applied magnetic field, comprising;
a magnetizing coil which emits a magnetic field that excites the magnetic material;
a dummy coil which generates a magnetic field that excites the magnetic material by electromagnetic induction caused by a magnetic field emitted from the magnetizing coil; and
a platen glass,
wherein the magnetizing coil or the dummy coil is disposed below the platen glass,
the dummy coil is disposed at a position where the electromagnetic induction is generated, and
the dummy coil has no electrically conductive connection to a driving circuit.

* * * * *